UNITED STATES PATENT OFFICE.

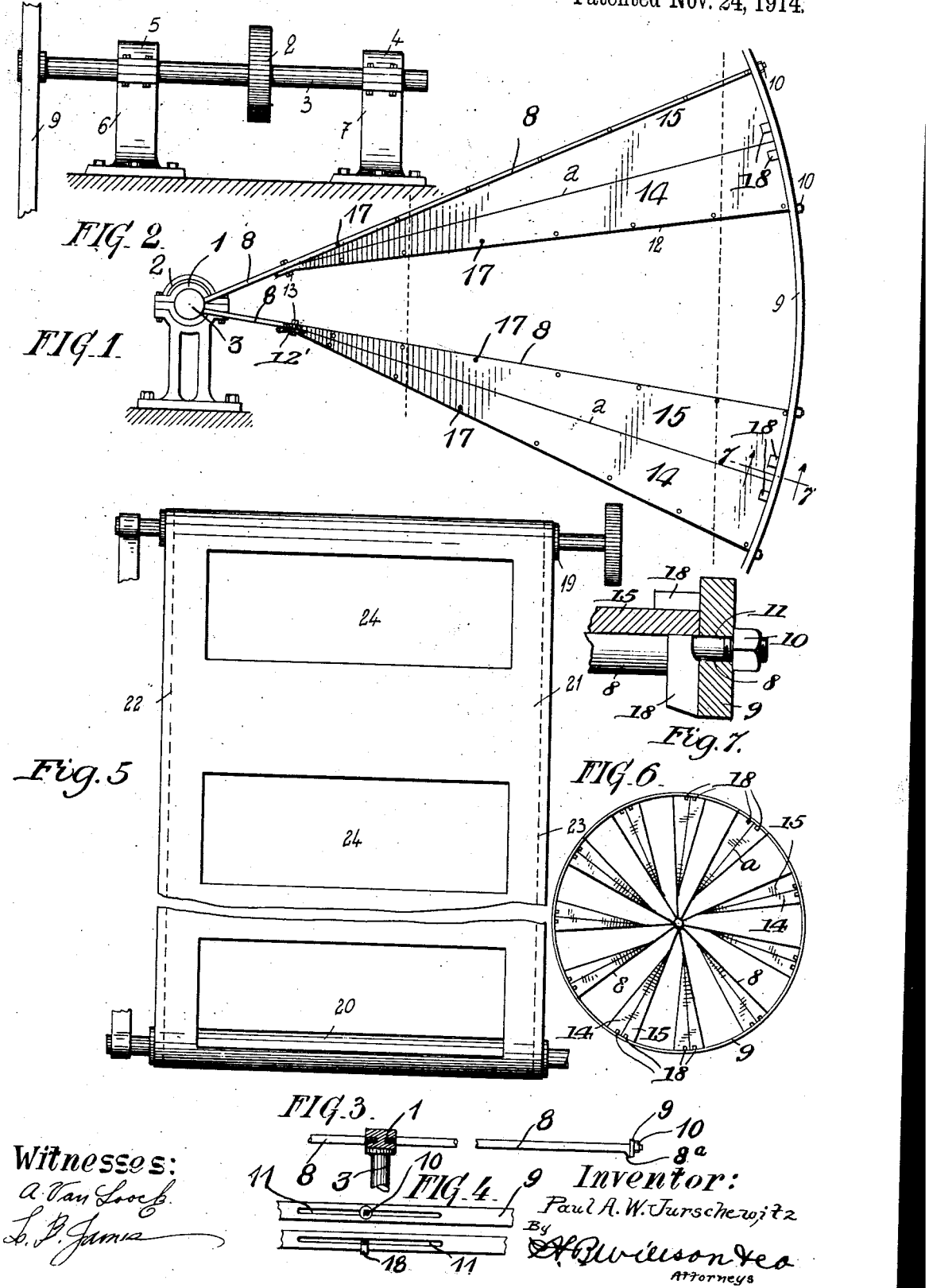

PAUL ARTUR WALDEMAR JURSCHEWITZ, OF ST. PETERSBURG, RUSSIA, ASSIGNOR OF ONE-THIRD TO KONSTANTIN F. KARPOWITSCH AND ONE-THIRD TO NIKOLAI N. POPOFF, BOTH OF ST. PETERSBURG, RUSSIA.

KINEMATOGRAPHIC-PICTURE SCREEN.

1,118,289.      Specification of Letters Patent.      Patented Nov. 24, 1914.

Application filed January 30, 1913. Serial No. 745,296.

*To all whom it may concern:*

Be it known that I, PAUL ARTUR WALDEMAR JURSCHEWITZ, a subject of the Russian Emperor, and residing at 118/II Sabalkansky Prospekt, Quart. 60, St. Petersburg, Russia, have invented certain new and useful Improvements in Kinematographic-Picture Screens, of which the following is a specification.

The kinematographic projections heretofore produced were not very clear nor deep, and to an observer standing close to the screen the images appear very indistinct. These defects are produced by various means. For instance they are sometimes caused by the system of kinematographic projection, which consists of a very rapid succession of individual images, and as the human eye cannot, in consequence of such rapid succession, recognize and distinguish the individual images, one image appears to pass over into the next, so that the illusion of movement in the images projected is thereby produced. This continuous rapid changing of the images, so that the human eye will not perceive it, results in causing the pictures to appear indistinct to the observer. This indistinctness is possibly still further increased by the so-called Maltese cross, which is formed in a disk by cutting from it, and revolving it in front of the objective lens of the projection apparatus. This Maltese cross is designed to screen the changes between the individual pictures during the advance of the film in operation. Another cause of the indistinctness of the projected images lies in the unevenness of the screen on which the images are projected. When bright images are projected the unevenness and irregularities of apparently quite smooth surfaces appear in a very disturbing manner. It has already been attempted to obviate this trouble by employing absolutely smooth screens covered with a layer of metal or metallic paint, the so-called aluminum screens and the like, but without any real success.

The object of the invention is to produce images which are perfectly clear and distinct even when the observer is very close to the screen. This object is effected by employing a rapidly revolving screen the surface of which is non-continuous, by having sections cut away.

In the accompanying drawings two constructional forms of such screens are exemplified.

Figure 1 is a front elevation of a screen revolving around its axis, a portion only of the screen being shown; Fig. 2 is a side elevation of this screen; Figs. 3 and 4 illustrate the manner of securing the elements composing this screen; Fig. 5 is a front elevation of another form of the screen shown traveling in a vertical direction. Fig. 6 is a front elevation of the complete screen, a portion of which is shown in Fig. 5. Fig. 7 is an enlarged cross sectional view taken on the line 7—7 of Fig. 1.

The revolving screen according to Fig. 1 is shown in part only in the drawing and is so arranged that its center is situated outside of the image to be projected, or in other words, the surface serving as a screen for the images projected forms a part only of the entire revolving screen, the screen proper being indicated by the dotted lines in Fig. 1. This screen is made in the form of a wheel and several segments *a a* thereof are covered with canvas or metal, for instance aluminum. These sections or segments are so arranged, that their size may be increased at will, and the intermediate spaces reduced.

Fig. 1 shows a part of a screen rotating about its axis, parts thereof being shown in section. To each of these stays or spokes 8 is attached an auxiliary stay rod or spoke 12, which is guided by its outer end in a slot 11 in the flange 9 and is adjustably secured to the stay by means of a screw bolt 13, which passes through a slot 12′ provided in the stay 12 and the nut on bolt 13 is loosened when it is desired to adjust the sector and after the outer end of the spoke 12 has been properly positioned in the slot 11 said nut is again tightened. To each of these stays 8 and 12 a sector-shaped plane 14 and 15 is secured at one of their radial edges by means of screws 17 or the like. The outer arc-shaped edges of these planes are guided between blocks 18 provided for this purpose on the inner side of the flange 9, and spaces are left between the sector 15 carried by one stay 8 and the sector 14 carried by another stay 8. When the stay 12 is adjusted within the slot 11 of the flange 9, the surface formed by the sectors 14 and 15 may be enlarged or reduced, and the spaces between the sectors 15 secured to one stay 8 and those 14 secured to another correspondingly enlarged or reduced.

Fig. 5 illustrates a screen composed of two steel bands 22 and 23 running over rollers 19 and 20 and covered with an endless band of flexible material. In this endless band holes 24 are cut, which will let the light pass through them and which may be varied in size.

Both arrangements are driven by means of a motor.

The screen is moved so rapidly that the surface on which the images are projected will not be seen by the eye. The observer will have the impression, that (similar to a fan revolving at a high speed) there is nothing at the point where the screen is rapidly revolving, as long as no images are projected onto the screen. It will therefore be possible to produce very varied effects and illusions, for instance if the rapidly moving screen is arranged in front of a stage. Persons, actors or also stage properties and other articles will then remain clearly visible behind the screen, even if pictures are projected on it.

Special effects may also be obtained by suitably illuminating the background, whereby the outlines of the picture may be emphasized.

The movement of the screen can be effected by any other means than the one represented here.

I claim as my invention:

1. An arrangement for producing plastic kinematographic pictures consisting of a screen adapted to travel at a high speed against which the pictures are projected, the surface of said screen being composed of a series of sections having spaces between them, said sections being adjustable to vary the size of the spaces.

2. An arrangement for producing plastic kinematographic pictures consisting of a screen adapted to travel at a high speed, said screen having a plurality of openings therein, and means for varying the size of said openings.

3. An arrangement for producing plastic kinematographic pictures consisting of a screen adapted to revolve at high speed around an axis, the said screen being composed of a plurality of segments arranged like the spokes of a wheel, and having spaces between them, said segments being adjustable to allow of increasing or reducing the intermediate spaces at will.

In testimony whereof I have hereunto set my hand in the presence of two subscribing witnesses.

PAUL ARTUR WALDEMAR JURSCHEWITZ.

Witnesses:
   WOLDEMAR HAUPT,
   HENRY HASPER.